Patented Jan. 25, 1944

2,339,770

UNITED STATES PATENT OFFICE 2,339,770

SYNTHETIC CONDENSATION PRODUCT

Gaetano F. D'Alelio, Pittsfield, Mass., assignor to General Electric Company, a corporation of New York No Drawing. Application August 30, 1941, Serial No. 409,020

12 Claims. (Cl. 260—42)

This invention is concerned with the production of new and useful synthetic condensation products. More particularly, it relates to synthetic products derived from novel starting materials containing amino, amido, and imino linkages. Specifically, it is concerned with and has as its principal object the preparation of resinous compositions obtained by condensation reactions involving certain novel mono-(monocarbinolureidomethyl) amines, including substituted mono-(monocarbinolureidomethyl) amines and substituted and unsubstituted mono-(monocarbinolthioureidomethyl) amines, of the general formula

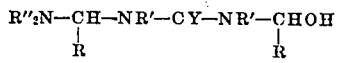

wherein Y represents oxygen or sulphur, R represents hydrogen or a monovalent aliphatic, carbocyclic or aromatic hydrocarbon radical of not more than six carbon atoms and R' and R'' represent either hydrogen or any monovalent hydrocarbon or halo-hydrocarbon radical, whether saturated or unsaturated, aliphatic, alicyclic aromatic or heterocyclic, mono- or poly-nuclear, etc.

A further object of the invention is to provide materials which may be incorporated into and reacted with other resins and resin-forming materials. Another object of this invention is to provide a class of organic compounds which may be used as catalytic reactants in the preparation of resins depending on condensation reactions or as curing reactants for resins obtained through condensation reactions. Still other objects of the invention will appear as the description of the invention proceeds.

The preformed mono-(monocarbinolureidomethyl) amines represented by the above formula and containing both carbinol (—CHROH) and ureido (—NR'—CO—NR'—) (or thioureido —NR'—CS—NR'—) groupings may suitably be prepared by reacting, in the cold, a concentrated aqueous solution of 1 mol of ammonia or a primary or secondary amine with a concentrated solution of 1 mol of a preformed di-(N-carbinol) urea, which term is intended to cover the simple dicarbinol derivatives of urea, such as dimethylol urea and also the dicarbinol derivatives or substituted dicarbinol derivatives of urea and thiourea, or substituted ureas and thioureas represented by the formula

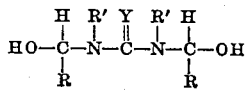

wherein, as previously indicated, Y represents oxygen or sulphur, R represents hydrogen or a monovalent aliphatic, carbocyclic or aromatic hydrocarbon radical of not more than six carbon atoms, and R' represents hydrogen or any monovalent hydrocarbon radical, examples of which are aliphatic (e. g. methyl, ethyl, propyl, isopropyl, butyl, secondary butyl, isobutyl, butenyl, amyl, isoamyl, hexyl, allyl, etc.) including cycloaliphatic (e. g. cyclopentyl, cyclopentenyl, cyclohexyl, cyclohexenyl, cycloheptyl, etc.); aryl (e. g. phenyl, diphenyl, naphthyl etc.); alkaryl (e. g. tolyl, xylyl, ethylphenyl, propylphenyl, isopropylphenyl, etc.); and their homologues, as well as those groups with one or more of their hydrogen atoms substituted by a halogen. Specific examples of halogeno-substituted hydrocarbon radicals are chlorcyclohexyl, chlorphenyl, dichlorphenyl, ethyl chlorphenyl, phenylchlorethyl, bromethyl, bromtolyl, etc.

Examples of di-(N-carbinol) ureas other than dimethylol urea previously mentioned are: dimethylol thiourea, methylol methylcarbinol urea and thiourea, di-(methylcarbinol) urea and thiourea, di-(propylcarbinol) urea and thiourea, dimethylol phenyl urea and thiourea, dimethylol allyl urea and thiourea, etc.

Preferably the novel mono-(monocarbinolureidomethyl) amines are prepared by slowly adding a cold concentrated aqueous solution of ammonia or a primary or secondary amine to a cold concentrated aqueous solution of the desired di-(N-carbinol) urea in the ratio of 1 mol of ammonia or amine to 1 mol of the di-carbinol urea at a temperature between 0° and 20° centigrade. The mixture is held within this temperature range during the course of the condensation reaction in which the two ingredients react as follows:

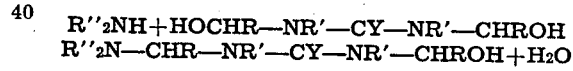

Thus one mol of ammonia reacts with one mol of dimethylol urea to form the simplest mono-(monocarbinolureidomethyl) derivative, mono-(monocarbinolureidomethyl) amine having the formula

The product of this reaction may be recovered by evaporation of the water at or below room temperature under atmospheric or subatmospheric pressures. Alternatively, the product may be recovered by adding to the aqueous solution of the reaction product a suitable water-miscible precipitant for the reaction product, which precipitant is incapable of reacting with the desired product at operating temperatures.

The compounds of the general formula

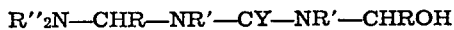

may be resinified under the influence of heat, the compound H₂NCH₂NHCONH₂OH being most readily resinified under such conditions. The relative ease of resinification decreases with increased substitution of the various substitutable hydrogens by hydrocarbon radicals. Resinification may be accomplished by heating the compound alone, in an inert medium, or in an inert solvent such as water. Resinification may be accelerated by the addition or presence of basic materials, acidic materials, neutral, acid, or alkaline salts. Reactive media may likewise be used to achieve resinification as hereinafter shown.

These novel compounds may also be used as reactant catalysts in the preparation of synthetic resins from aldehyde and other aldehyde reactable organic compounds, e. g. in the condensation or urea-formaldehyde, thiourea-formaldehyde, melamine-aldehyde, amino pyrimidine-aldehyde, guanazole-aldehyde, protein-aldehyde, phenol-formaldehyde, etc. By a reactant catalyst is meant a substance which will accelerate the condensation between the aldehyde and the aldehyde reactable body during the preparation of the resin while it itself becomes part of the resin. Since these compounds become part of the resins, the final resins strictly may be called aminoplast resins.

Being bases, the novel amines form salts with inorganic and organic acids such as hydrochloric, sulfuric, nitric, hydrofluoric, carbonic, formic, acetic, propionic, butyric, chloracetic, dichloracetic, benzoic, phthalic, cyclohexyl, carboxylic, oxalic, malonic, succinic, adipic, maleic, fumaric, citraconic, acrylic, methacrylic, atropic, polyacrylic, polymethacrylic acids, etc. These salts are extremely valuable in accelerating the conversion of the base compound

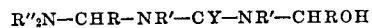

to a resinous state.

The salts of the novel class of compounds of this invention may be used as curing reactants for aminoplast and other resins such as urea-aldehyde resins, aminotriazine-aldehyde, resins, etc. By a curing reactant is meant a compound which causes the curing or accelerates the curing of a resin and at the same time becomes an integral part of the resin.

The novel class of crystalline, preformed organic compounds may be mixed with resin intermediates containing carbinol (—CR₂OH) groups, such as monomethylol ureas, dimethylol ureas, phenol methylols, the methylols of cyclic amidines, e. g. melamine methylols, etc. and then co- or inter-resinified alone or in the presence of other modifying bodies to give intercondensed resins.

The novel compounds of this invention, particularly the highly substituted compounds, may be used as plasticizers for many resins. In many cases they themselves become resinous during the plasticizing process, while in other cases they condense with the other resinous intermediate during manufacturing operations. Specifically, these materials may be used (1) unconverted as plasticizers, (2) partly or completely converted as plasticizers, (3) partly or completely intercondensed to exert a plasticizing effect. The final and intermediate resins prepared from the novel materials of this invention alone or with the modifications expressed herein are extremely compatible with many other natural or synthetic resins in their intermediate or ultimate stages.

The novel base materials of this invention may be used to peptize or swell proteins, shellac, acid alkyd resins, etc., bringing them into solutions, or dispersions, or emulsions, or gels. Such composition may be "hardened" with or without the addition of aldehydes.

The compounds alone or under catalytic influences as above expressed, will condense with many classes of compounds which form methylols and substituted methylols with formaldehyde, its polymers and homologues, for example with hydroxy compounds, e. g., methyl, ethyl, propyl, isopropyl, butyl, amyl, tertiary amyl, benzyl, furfuryl, tetrahydrofurfuryl, cyclohexyl, phenethyl, naphthyl, polyvinyl, allyl, methallyl, crotyl, 1 - chlorallyl, propargyl, 2 - chlorallyl, cinnamyl alcohols, etc. glycol, diethylene glycol, triethylene glycol, polyethylene oxide, glycerine, pentaerythritol, saligenin, phenol, cresol, xylenol, resorcinol, catechol, pyrogallol, etc. chlorohydrin, epi-chlorohydrin, nitrobutanol, diacetone alcohol, ethylene oxide, propylene oxide, etc.; ammonia and its amino, amido, or imino compounds, e. g. methylamine, dimethylamine, hydroxylamine, hydrazine, phenyl hydrazine, diamylamine, stearyl amine, cyclohexyl amine, aniline, di-phenylamine, diaminobenzene, triaminobenzene, aminophenol, nitro aniline piperazine, ethanolamine, di-isopropanolamine, triethanolamine, propanolamine, ethylene diamine, formamide, acetamide, propionamide, lauramide, acrylic amide, methacrylic amide, succinic diamide, citraconic triamide, benzamide, phthalic diamide, phthalimide, benzoyl sulfonimide, benzoyl sulfonylimide, aminobenzene sulfonylamide, benzene disulfonylamide, benzene trisulfonylamide, anthanilic esters, anthranilamide, salicylamide, para-phenyl benzene sulfonylamide, tolyl amide, etc.; the cyclic amidines including the amino 1,3,5 triazines, e. g. 2,4,6 triamino 1,3,5-triazine, 2-amino-1,3,5-triazine, 2,4-diamino-1,3,5-triazine; the diazines, e. g. 2,4,6 triamino-pyrimidine, the diamino pyrimidine thio ethers; the amino-1,2,4-triazoles, e. g. guanazole, phenyl guanazole, dihydrazamido-1,2,4 pyrrodiazole, the amino 1,2 diazoles, e. g. 3,5 diamino-pyrazole, guanazo-guanazole, imidurazo-guanazole, the urea type compounds, e. g. urea, methylurea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, di-cyandiamide, guanyl urea, guanyl thiourea, the proteins, e. g. casein, soya bean protein, alfalfa protein gelatin, coffee bean protein, alkyd resins having free hydroxyl groups such as glyceryl phthalate, oil-modified glyceryl phthalate, diethylene glycol succinate, triethylene glycol maleate, glyceryl maleate, etc.; nitriles, e. g. acetonitrile, propionitrile, butyronitrile, benzonitrile, acrylonitrile, methacrylonitrile, atropic nitrile, ethylene cyanohydrin, acetone cyanohydrin, amino-isobutyronitrile, aminoacetonitrile, etc.; esters such as lactic esters, hydroxy isobutyric esters, aceto-acetic ester, malonic esters, etc.

The novel compounds of this invention, alone or modified, will also form self-curing aminoplasts by condensation with curing reactants such as chloracetonitrile nitrourea, glycine, amino propanol hydrochloride, alpha beta dibrompropionitrile, mono-, di-, or tri-chloracetamides, aminoacetamide hydrochloride, ethylene diamine monohydrochloride, sulfamic acid, chloracetyl urea, citric diamide, phenacyl chloride and others mentioned, for example, in my copending applications, Serial No. 346,962, filed July 23, 1940, and Serial No. 354,395, filed August 27, 1940, both of which applications are assigned to the same assignee as the present invention.

The various ways in which my novel compounds may be used with or without the addition of various modifiers, in the preparation of resinous compositions will become apparent from the following examples illustrating how the principles of this invention are carried into effect.

*Example 1*

A quantity of a 25% water solution of H₂NCH₂NHCONHCH₂OH was evaporated to dryness by heating to 100° C. and yielded at 125° C. a clear, colorless resin. The softening point of the resin was advanced by prolonging heating at 125° C.

*Example 2*

A 25% water solution of

was treated with various amounts of hydrochloric acid to give solutions of mixtures of

and H₂NCH₂NHCONHCH₂OH and solutions of HCl.H₂NCH₂NHCONCH₂OH alone or in excess acid. These products produced clear, colorless, hard, infusible resins when heated on the hot plate at 150° C.

*Example 3*

| | Parts by weight |
|---|---|
| Urea | 60 |
| Aqueous formaldehyde (approx. 37.1% CH₂O) | 160 |
| H₂NCH₂NHCONHCH₂OH | 6 | were mixed and refluxed for 30 minutes. A clear, colorless syrup was obtained that produced an infusible hard resin when tested on the hot plate at 150° C. The syrup was converted into a molding compound by mixing 23 parts thereof with 7 parts alpha flock and .04 part zinc stearate. The compound was dried at 70° C. for 4 hours. When molded at 130° C. and 2000 pounds per square inch pressure a well-cured molded piece was obtained.

*Example 4*

| | Parts by weight |
|---|---|
| Dimethylol urea | 15 |
| H₂NCH₂NHCONHCH₂OH | 1.5 | were dissolved in 17 parts water and heated under reflux for 30 minutes. The syrup product was clear and had a pH of 6.9. The addition of small amounts of curing reactants and acids to this syrup produced self-curing resins that became infusible on the hot plate at 150° C. One-tenth part chloracetamide was added to 23 parts of the syrup and the mixture refluxed for 10 minutes. The clear, colorless syrupy product was mixed with 7 parts alpha flock and 0.04 part zinc stearate and the resulting compound dried at 70° C. for 4 hours. A well-cured light-colored piece was obtained by molding the dried compound at 130° C.

*Example 5*

| | Parts by weight |
|---|---|
| Aqueous trimethylol melamine (50% conc.) | 9 |
| Aqueous H₂NCH₂NHCONHCH₂OH (25% conc.) | 18 | were heated together under reflux for 15 minutes. Samples of the resulting syrup yielded a resin that cured to the infusible state when treated with curing reactance and acids (e. g. chloracetamide, citric acid, etc.) at 150° C. This syrup was converted to a molding compound by refluxing 15 parts syrup with 0.05 part chloracetamide for 10 minutes, adding 7 parts alpha flock and 0.04 part zinc stearate to the refluxed product, and drying the wet compound at 70° C. for 4 hours. When molded at 130° C. a very well-cured piece was produced.

*Example 6*

The following:

| | Parts by weight |
|---|---|
| Aqueous H₂NCH₂NHCONHCH₂OH (25% conc.) | 95 |
| Glycerine | 9 | were mixed and refluxed for 30 minutes to yield a clear syrup with a pH of 8.75. Upon evaporation of the water present in the syrup, a clear, colorless thermoplastic resin was obtained. The addition of various agents, such as acids, (citric, sulfamic, etc. or intercondensing compounds such as chloracetamide, glycerine, etc.), produced resins curable to an infusible state.

*Example 7*

| | Parts by weight |
|---|---|
| Aqueous H₂NCH₂NHCONHCH₂OH (25% conc.) | 95 |
| Glycerine | 9 |
| Aqueous formaldehyde (approx. 37.1% CH₂O) | 32 | were mixed and refluxed for 30 minutes. A clear colorless alcohol-soluble resin was obtained by evaporating the water from the syrup. Agents, as mentioned in the preceding example, caused the conversion of the product to a hard, infusible resin.

*Example 8*

| | Parts by weight |
|---|---|
| H₂NCH₂NHCONHCH₂OH in 10 parts water | 24 |
| Butyl alcohol | 74 | were mixed and heated under reflux for one hour to produce a clear syrup with a pH of 8.7. Concentration of the syrup gave a clear, colorless, viscous resin that could be converted to a hardened state by treatment with suitable agents.

*Example 9*

| | Parts by weight |
|---|---|
| H₂NCH₂NHCONHCH₂OH in 10 parts water | 24 |
| Butyl alcohol | 74 |
| Aqueous formaldehyde (approx. 37.1% CH₂O) | 32 | were heated together under reflux for one hour to yield a clear, colorless syrup which could be evaporated to a clear, colorless, very viscous resin. Conversion to a hardened state was accomplished by the addition of suitable curing agents.

*Example 10*

| | Parts by weight |
|---|---|
| H₂NCH₂NHCONHCH₂OH in 10 parts water | 24 |
| Diethyl malonate | 32 | were mixed and heated at reflux temperature for one hour to produce a clear syrup having a pH of 9.5. When concentrated by evaporation at 120° C. a pale yellow viscous resin was obtained. This resin became heat-hardenable by treatment with curing agents. The fusible resin was alcohol-soluble.

*Example 11*

| | Parts by weight |
|---|---|
| Aqueous $H_2NCH_2NHCHCONHCH_2OH$ (25% conc.) | 95 |
| Acetamide | 12 | were heated together under reflux for one hour. A clear syrup having a pH of 9.3 was produced. When treated on the hot plate at 150° C. with curing reactants and acids, an infusible resin was obtained.

*Example 12*

| | Parts by weight |
|---|---|
| Aqueous $H_2NCH_2NHCONHCH_2OH$ (25% conc.) | 95 |
| Acetamide | 12 |
| Aqueous formaldehyde (approx. 37.1% $CH_2O$) | 32 | were mixed and heated under reflux for one hour. A clear syrup was obtained, which, when dehydrated, gave a clear, pale yellow viscous resin. This, or the intercondensation product of Example 11, may be used as a plasticizer for aminoplast resins in general. Treatment of the syrup with acids or curing reactants gave self-curing resins.

*Example 13*

| | Parts by weight |
|---|---|
| Melamine | 6.3 |
| Aqueous formaldehyde (approx. 37.1% $CH_2O$) | 12.0 |
| Aqueous $H_2NCH_2NHCONHCH_2OH$ (25% conc.) | 4.0 | were refluxed together for 15 minutes to produce a clear syrup with a pH of 8.78. When samples thereof were treated with acids or intercondensing agents on the hot plate at 150° C. self-curing resins resulted. The syrup was converted to a molding compound by refluxing 12 parts thereof with 0.05 part chloracetamide for 10 minutes and then adding 3.5 parts alpha flock and 0.02 part zinc stearate to the refluxed product. After drying the compound was molded at 130° C. The molded piece exhibited excellent cure.

*Example 14*

A phenol-varnish was compounded as follows:

| | Parts by weight |
|---|---|
| Phenol—82% (12% orthocresol) | 180 |
| Aqueous formaldehyde (approx. 37.1% $CH_2O$) | 216 |
| $Na_2CO_3H_2O$ in 4.15 parts water | 1.8 |

These ingredients were mixed and heated under reflux for 30 minutes. A resinous solution having a hot plate cure at 150° C. of 85 seconds was obtained. The resin solids amounted to 53% by weight of the varnish which had a pH of 8.8.

The addition of 10 parts $H_2NCH_2NHCONHCH_2OH$ (solid basis) to 90 parts of this phenol-aldehyde varnish (on basis of solids content) produced a mixture having a cure of 75 seconds as compared with the 85 seconds required for the phenol-aldehyde varnish. The addition of 10 parts of the varnish (based on solids content) to 90 parts of aqueous $H_2NCH_2NHCONHCH_2OH$ (based on solids content) produced a mixture curable to light-colored, infusible resin at 150° C.

*Example 15*

Examples 13 and 14 were repeated, but using instead of the phenol-aldehyde varnish, a substantially anhydrous liquid phenol-aldehyde resin, freed from catalyzing bases and salts. Results similar to those obtained in Example 14 were noted. The addition of 10% by weight on a solids basis of $H_2NCH_2NHCONHCH_2OH$ to the catalyst-free varnish lowered the cure at 160° C. from 135 seconds to 105 seconds.

*Example 16*

| | Parts by weight |
|---|---|
| Shellac | 50 |
| $H_2NCH_2NHCONHCH_2OH$ | 5 | were mixed well and fused on the hot plate at 150° C. At this temperature the mixture cured to a hard infusible resin. The addition of paraform hastened this cure. The modified shellac may be used as a mica binder.

*Example 17*

| | Parts by weight |
|---|---|
| Alkyd resin (e. g. glyceryl phthalate) | 50 |
| $H_2NCH_2NHCONHCH_2OH$ | 5 | were mixed together and tested on a hot plate at 150° C. The mixture cured to a hard, infusible resin. The addition of paraform also accelerated this cure. The modified alkyd resin may be used as a mica binder.

*Example 18*

Self-curing aminoplasts were produced by condensing $H_2NCH_2NHCONHCH_2OH$ with small quantities of various intercondensing curing reactants including chloracetamide, nitro urea, trichloracetamide, phenacyl chloride, alpha-beta dibromopropionitrile, chloracetonitrile, chloral urea, sulfamide, citric acid diamide, and polysalicylide. The co-condensation of $H_2NCH_2NHCONHCH_2OH$ and formaldehyde along with these intercondensing reactants also gave self-curing aminoplast resins.

*Example 19*

A urea-aldehyde was compounded as follows:

| | Parts by weight |
|---|---|
| Urea | 60 |
| Aqueous formaldehyde (approx. 37.1% $CH_2O$) | 161 |
| Aqueous $NH_3$ (28% conc.) | 6 |
| NaOH in 5 parts water | 0.1 |

These ingredients were mixed and refluxed for 30 minutes to form a varnish. To 23 parts of this varnish was added 2% by weight on a solids basis of $H_2NCH_2NHCONHCH_2OH$ and the reflux continued for 30 minutes. 0.1 part chloroacetamide was then added and the reflux continued for an additional 10 minutes. The resulting syrup produced a self-curing resin when tested on the hot plate at 150° C. Other intercondensing reactants may be substituted for the chloracetamide to produce self-curing resins.

*Example 20*

About 0.1 part $HCl.H_2NCH_2NHCONHCH_2OH$ was added to 23 parts of the urea-aldehyde varnish of Example 19 to produce a syrup with a pH of 4.8. A sample of this syrup yielded a hard, infusible resin when tested on the hot plate at 150° C. A molding compound containing the above syrup was made by mixing it with 7 parts alpha flock and 0.04 part zinc stearate, and then drying the wet compound at 70° C. for 3 hours. Molding at 130° C. produced a very well-cured piece.

*Example 21*

Eighteen parts of a 25% water solution of $H_2NCH_2NHCONHCH_2OH$ were refluxed for 30 minutes. 9 parts of a 50% water solution of trimethylol melamine were added and the reflux continued for 5 minutes, at which time a resin began to precipitate. This syrup gave a self-curing resin when tested on the hot plate at 150° C. The addition of acids and curing reactants accelerated this cure.

*Example 22*

| | Parts by weight |
|---|---|
| Aqueous $H_2NCH_2NHCONHCH_2OH$ (25% conc.) | 95 |
| Polyvinyl alcohol in 5 parts water | 53 | were heated together under reflux for 15 minutes. A clear, colorless viscous syrup was produced that, when tested on the hot plate at 150° C. gave a clear, thermoplastic resin. The type of cured resin obtainable could be governed by controlling the pH of the syrup. Tough, transparent coatings were produced by baking the films of the resin at moderately low temperatures for a period of several hours.

*Example 23*

| | Parts by weight |
|---|---|
| p-Toluene sulfonamide | 43 |
| Aqueous formaldehyde (approx. 37.1% $CH_2O$) | 40 |
| Aqueous $H_2NCH_2NHCONHCH_2OH$ (25% conc.) | 24 | were mixed and refluxed for 15 minutes. The syrup was concentrated by evaporation to leave a clear, pale yellow viscous resin, samples of which cured to an infusible mass when treated with acids and curing reactants on the hot plate at 150° C. This resin was soluble in "Solvatone."

*Example 24*

| | Parts by weight |
|---|---|
| Phenol, synthetic | 90 |
| Aqueous formaldehyde (approx. 37.1% $CH_2O$) | 195 |
| Aqueous $H_2NCH_2NHCONHCH_2OH$ (25% conc.) | 9.5 | were heated together under reflux for one hour. The resulting syrup cured to an infusible resin on the hot plate at 150° C. under the influence of either acidic or basic agents.

*Example 25*

An aqueous solution of

obtained by reacting one mol butyl amine with one mol dimethylolurea in cold concentrated solution was evaporated at 130° C. to produce a clear, colorless resin. The softening point was advanced by heating at 130–150° C.

*Example 26*

| | Parts by weight |
|---|---|
| $CH_2NH(CH_2NHCONHCH_2OH)$ in 15 parts water | 13.3 |
| Aqueous formaldehyde (approx. 37.1% $CH_2O$) | 8.1 |
| Aqueous ammonia (28%) | 0.2 | were heated together under reflux for 1 hour. The resulting syrup was clear and of a pale yellow color. At 140° C. on a hot plate the syrup bodied to a transparent soft resin. The use of acids or intercondensing curing reactants caused the syrup to cure to an infusible mass at the above temperature.

This resin may be employed in impregnating and adhesive solutions or with a filler in molding compositions.

*Example 27*

| | Parts by weight |
|---|---|
| $CH_3NH(CH_2NHCONHCH_2OH)$ in 15 parts water | 13.3 |
| Aqueous formaldehyde (approx. 37.1% $CH_2O$) | 8.1 |
| Urea | 6.0 |
| Aqueous ammonia (28%) | 0.2 | were mixed and reacted at reflux temperature for 1 hour. The resulting clear syrup became a transparent thermoplastic resin when bodied at 140° C. When samples of this syrup were tested at this temperature with the addition of various curing agents (e. g. citric acid, sulfamic acid, chloracetamide, glycine, etc.) the samples yielded heat-hardened infusible resins.

Twenty-one parts of this syrup were mixed with 0.2 part chloracetamide and refluxed for 15 minutes. Seven parts alpha flock and 0.04 part zinc stearate were added and the compound dried at 70° C. for 8 hours. Molding at 135° C. and 2000 lbs. sq. in. pressure for 5 minutes produced a nicely cured article. The compound in molding exhibited very good flow characteristics.

In producing these various condensation products dyes, pigments, plasticizer, mold lubricants, opacifiers, and various fillers (e. g. wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used, as has been shown, as modifiers of other natural and synthetic resins, as laminating varnishes in the production of laminated articles wherein sheet materials, e. g. paper, cloth, sheet asbestos, etc. are coated and impregnated with the resin, superimposed and thereafter united under heat and pressure. They may also be used as modifiers of, or may be modified by, the synthetic compositions disclosed in various copending applications of mine, for example in copending applications, Serial Nos. 409,017; 409,018; 409,019; 409,021; and 409,022, filed concurrently herewith and assigned to the same assignee as the present invention. More specifically, the compositions of this invention may be used in the form of mixtures with, condensation products of preformed substituted or unsubstituted mono-, di-, or tri-(carbamidomethyl) amines and aldehydes, or condensation products of substituted or unsubstituted di- or tri-(monocarbinolureidomethyl) amines, or with two or more of such condensation products. They may be used in the production of wire or baking enamels, for bonding or cementing together mica flakes to form a laminated mica article, for bonding together abrasive grains in the production of resin-bonded abrasive articles such for instance as grindstones, sandpapers, etc. They also may be employed for treating cotton, linen, and other cellulosic materials in sheet or other form. They also may be used as impregnants for electrical coils and for other electrically insulating applications.

What I claim as new and desire to secure by Letters Patent of the United States, is:

1. A composition of matter comprising the condensation product obtained by heating an organic compound of the formula

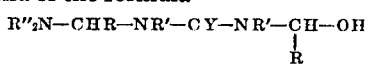

where Y represents oxygen, R represents a member of the class consisting of hydrogen and monovalent hydrocarbon radicals of not more than six carbon atoms, R' represents a member of the class consisting of hydrogen, monovalent hydrocarbon and halogeno-substituted hydrocarbon radicals, one R" represents a monovalent hydrocarbon radical and the other R" represents a member of the class consisting of hydrogen, monovalent hydrocarbon radicals and monovalent halogeno-hydrocarbon radicals.

2. A composition of matter comprising the reaction product of (1) an organic compound of the formula

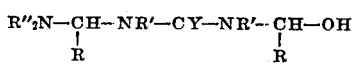

where Y represents oxygen, R represents a member of the class consisting of hydrogen and monovalent hydrocarbon radicals of not more than six carbon atoms, R' represents a member of the class consisting of hydrogen, monovalent hydrocarbon and halogeno-substituted hydrocarbon radicals, one R" represents a monovalent hydrocarbon radical and the other R" represents a member of the class consisting of hydrogen, monovalent hydrocarbon radicals and monovalent halogeno-hydrocarbon radicals and (2) a reaction product of an aldehyde and an aldehyde-reactable organic compound which forms a methylol derivative when reacted with formaldehyde.

3. A composition of matter comprising the reaction product of (1) an organic compound of the formula

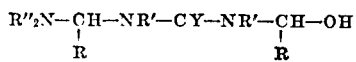

where Y represents oxygen, R represents a member of the class consisting of hydrogen and monovalent hydrocarbon radicals of not more than six carbon atoms, R' represents a member of the class consisting of hydrogen, monovalent hydrocarbon and halogeno-substituted hydrocarbon radicals, one R" represents a monovalent hydrocarbon radical and the other R" represents a member of the class consisting of hydrogen, monovalent hydrocarbon radicals and monovalent halogeno-hydrocarbon radicals and (2) a resin intermediate containing methylol groups.

4. A composition as in claim 2 wherein the aldehyde-reactable organic compound is urea.

5. A composition of matter comprising the reaction product of (1) an organic compound of the formula

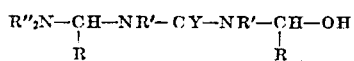

where Y represents oxygen, R represents a member of the class consisting of hydrogen and monovalent hydrocarbon radicals of not more than six carbon atoms, R' represents a member of the class consisting of hydrogen, monovalent hydrocarbon and halogeno-substituted hydrocarbon radicals, one R" represents a monovalent hydrocarbon radical and the other R" represents a member of the class consisting of hydrogen, monovalent hydrocarbon radicals and monovalent halogeno-hydrocarbon radicals, and (2) the reaction product of an aldehyde and a cyclic amidine having at least one hydrogen atom attached to the amino nitrogen.

6. A composition of matter comprising the heat convertible product of reaction of (1) a partial condensation product obtained by heating an organic compound of the formula

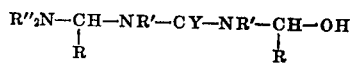

where Y represents oxygen, R represents a member of the class consisting of hydrogen and monovalent hydrocarbon radicals of not more than six carbon atoms, R' represents a member of the class consisting of hydrogen, monovalent hydrocarbon and halogeno-substituted hydrocarbon radicals, one R" represents a monovalent hydrocarbon radical and the other R" represents a member of the class consisting of hydrogen, monovalent hydrocarbon radicals and monovalent halogeno hydrocarbon radicals and (2) a chlorinated acetamide in the presence of dimethylol urea.

7. A product comprising the heat-cured composition of claim 5.

8. A composition as in claim 1 wherein the reaction-product is an alcohol-modified product of the stated component.

9. A composition comprising the product of reaction of polyvinyl alcohol and an organic compound of the formula

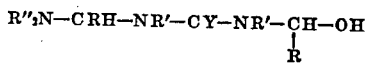

where Y represents oxygen, R represents a member of the class consisting of hydrogen and monovalent hydrocarbon radicals of not more than six carbon atoms, R' represents a member of the class consisting of hydrogen, monovalent hydrocarbon and halogeno-substituted hydrocarbon radicals, one R" represents a monovalent hydrocarbon radical and the other R" represents a member of the class consisting of hydrogen, monovalent hydrocarbon radicals, and monovalent halogeno-hydrocarbon radicals.

10. A composition as in claim 2 wherein the aldehyde-reactable organic compound is melamine.

11. A composition of matter comprising the reaction product of (1) an organic compound of the formula

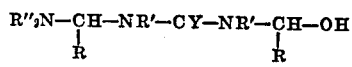

where Y represents oxygen, R represents a member of the class consisting of hydrogen and monovalent hydrocarbon radicals of not more than six carbon atoms, R' represents a member of the class consisting of hydrogen, monovalent hydrocarbon and halogeno-substituted hydrocarbon radicals, one R" represents a monovalent hydrocarbon radical, and the other R" represents a member of the class consisting of hydrogen, monovalent hydrocarbon radicals and monovalent halogeno-hydrocarbon radicals, and (2) a partial reaction product of formaldehyde and urea.

12. A composition of matter comprising the heat convertible product of reaction of (1) an organic compound of the formula

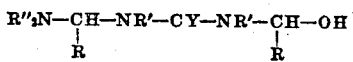

where Y represents oxygen, R represents a member of the class consisting of hydrogen and monovalent hydrocarbon radicals of not more than six carbon atoms, R' represents a member of the class consisting of hydrogen, monovalent hydrocarbon and halogeno-substituted hydrocarbon radicals, one R" represents a monovalent hydrocarbon radical and the other R" represents a member of the class consisting of hydrogen, monovalent hydrocarbon radicals and monovalent halogeno hydrocarbon radicals, and (2) a chlorinated acetamide in the presence of a partial reaction product of formaldehyde and urea.

GAETANO F. D'ALELIO.